US007274927B2

(12) United States Patent
Olrik

(10) Patent No.: US 7,274,927 B2
(45) Date of Patent: Sep. 25, 2007

(54) MOBILE TELECOMMUNICATIONS DATA SERVICE

(75) Inventor: Jakob Christian Olrik, Copenhagen (DK)

(73) Assignee: Nokia Corporation, Espoo (FI)

(*) Notice: Subject to any disclaimer, the term of this patent is extended or adjusted under 35 U.S.C. 154(b) by 135 days.

(21) Appl. No.: 10/344,159

(22) PCT Filed: Jul. 25, 2001

(86) PCT No.: PCT/EP01/08592

§ 371 (c)(1),
(2), (4) Date: Jun. 4, 2003

(87) PCT Pub. No.: WO02/15617

PCT Pub. Date: Feb. 21, 2002

(65) Prior Publication Data

US 2004/0092266 A1 May 13, 2004

(30) Foreign Application Priority Data

Aug. 11, 2000 (GB) .............................. 0019880.4

(51) Int. Cl.
*H04Q 7/22* (2006.01)
(52) U.S. Cl. .................. 455/414.4; 455/414.2; 455/414.3; 455/426.1; 709/219
(58) Field of Classification Search ............ 455/151.2, 455/403, 445, 466, 556.1, 556.2, 566, 414.1, 455/414.2, 414.3, 414.4, 426.1; 709/203, 709/217–219, 238; 370/395.52, 913
See application file for complete search history.

(56) References Cited

U.S. PATENT DOCUMENTS

| 5,692,073 | A * | 11/1997 | Cass ........................ 382/219 |
| 6,088,594 | A * | 7/2000 | Kingdon et al. ............ 455/457 |
| 6,247,048 | B1 * | 6/2001 | Greer et al. ................ 709/219 |
| 6,287,200 | B1 * | 9/2001 | Sharma ...................... 463/40 |
| 6,334,056 | B1 * | 12/2001 | Holmes et al. ............. 455/445 |
| 6,356,529 | B1 * | 3/2002 | Zarom ........................ 370/231 |
| 6,418,146 | B1 * | 7/2002 | Miloslavsky ................ 370/400 |
| 6,463,463 | B1 * | 10/2002 | Godfrey et al. ............. 709/206 |
| 6,473,609 | B1 * | 10/2002 | Schwartz et al. ........... 455/406 |
| 6,523,062 | B1 * | 2/2003 | Bridgman et al. .......... 709/203 |
| 6,611,291 | B1 * | 8/2003 | Nieves et al. .......... 348/333.01 |
| 6,658,251 | B1 * | 12/2003 | Lee et al. .................... 370/328 |
| 6,682,901 | B2 * | 1/2004 | Blaschuk et al. .......... 435/7.23 |
| 6,763,247 | B1 * | 7/2004 | Hollstrom et al. .......... 455/352 |
| 6,799,198 | B1 * | 9/2004 | Huboi et al. ................ 709/203 |
| 6,801,934 | B1 * | 10/2004 | Eranko ....................... 709/217 |

(Continued)

FOREIGN PATENT DOCUMENTS

EP 1 014 646 A 6/2000

(Continued)

*Primary Examiner*—William Trost
*Assistant Examiner*—James D Ewart
(74) *Attorney, Agent, or Firm*—Alston & Bird LLP

(57) ABSTRACT

A WAP enabled mobile telephone handset (MS 1) can access WAP servers using a browser which is located at a remote phone server (1). Image data produced by the browser at the phone server is converted into a bitmapped image that is sent to the handset for display. The browser at the phone server (1) can also be accessed through a personal computer (PC 1). The browser settings remain synchronized irrespective of whether the handset (MS 1) or (PC 1) is utilized. The phone server can also run other applications such as calendars, address books and computer games.

25 Claims, 6 Drawing Sheets

U.S. PATENT DOCUMENTS

| | | | | |
|---|---|---|---|---|
| 6,832,116 B1* | 12/2004 | Tillgren et al. | | 700/1 |
| 6,925,595 B1* | 8/2005 | Whitledge et al. | | 715/513 |
| 7,024,464 B1* | 4/2006 | Lusher et al. | | 709/219 |
| 2001/0018695 A1* | 8/2001 | Sequeira | | 707/513 |
| 2001/0037404 A1* | 11/2001 | Hafsteinsson et al. | | 709/246 |
| 2001/0043273 A1* | 11/2001 | Herrod et al. | | 348/220 |
| 2001/0044849 A1* | 11/2001 | Ndili et al. | | 709/230 |
| 2001/0047426 A1* | 11/2001 | Hunter | | 709/238 |
| 2002/0059344 A1* | 5/2002 | Britton et al. | | 707/513 |
| 2002/0112078 A1* | 8/2002 | Yach | | 709/246 |

FOREIGN PATENT DOCUMENTS

| | | |
|---|---|---|
| WO | WO 39666 A1 * | 7/2000 |
| WO | WO 01 52016 A | 7/2001 |

* cited by examiner though the embodiment will be described with reference to a mobile telephone handset, it will be understood that the invention is applicable to other mobile stations such as portable computers with wireless communication capabilities.

MOBILE TELECOMMUNICATIONS DATA SERVICE

BACKGROUND OF THE INVENTION

This invention relates to providing a mobile telecommunications data service and has particular but not exclusive application to use with wireless application protocol in order to provide data from a remote server to a mobile station such as a mobile telephone handset.

FIELD OF THE INVENTION

Conventional mobile stations such as telephone handsets have been used primarily for speech transmission. A wireless application protocol (WAP) has recently been developed in order to allow mobile telephone handsets to be used as web browsers. The mobile station, in use routes a call to a predetermined telephone number associated with a public land mobile network (PLMN) known as a WAP gateway, which provides connection to a WAP server. The server provides data in wireless mark-up language (WML) which can be considered as a variant of conventional hypertext mark-up language (HTML). WML allows data such as text or graphics to be arranged in decks of cards, such that when data is downloaded to a WAP enabled mobile station, individual cards can be displayed one at a time and the user can then navigate between the cards without requesting a new document from the server.

The conventional approach thus requires the mobile station to act as a client device that runs software to interact with servers at the remote sites. As a result, the client device can only be adjusted from the mobile station. For example, for a WAP enabled mobile device, a WAP browser is provided in the device for browsing WAP sites, which gives rise to a disadvantage that if the user wishes to access WAP sites from a personal computer, a different browser needs to be used on the personal computer, with its own settings, which cannot be synchronized to the settings of the WAP browser of the mobile station. Similar difficulties arise in synchronizing calendars, address books and other facilities which can be operated either from the computer or the mobile station.

Hitherto, a software product known as the PC Suite has been developed for the Nokia Model 8890 device which is run on a personal computer and allows the user to write text messages or manage the 'phone's memory from the personal computer. The PC Suite communicates with the phone through its infrared part and transfers updated data from the PC to the phone. The PC Suite is downloadable to the personal computer through the Internet. However, synchronization difficulties also arise with this software product.

The present invention seeks to overcome these problems and difficulties.

SUMMARY OF THE INVENTION

According to the invention there is provided a network for providing a mobile telecommunications data service, comprising a mobile client device with user actuable controls and a display device to provide a display of data, and a server configured to run a server process that provides a computer generated mobile client corresponding to the mobile client device, the computer generated mobile client being operable in response to the operation of the controls of the mobile client device to provide image data corresponding to a display to be displayed by the client device and to feed the image data to the client device to be displayed on the display thereof.

The image data may comprise a bitmapped image corresponding to the display generated by the mobile client running at the server. The server may be configured to compress the image data before feeding it to the mobile client device in order to improve transmission speeds.

Since the server provides the computer generated mobile client corresponding to the mobile client device, rather than the mobile client device itself, it is possible to access the computer generated mobile client from other locations. Thus, the invention may include a further client device, with the computer generated mobile client being responsive to actuation of the controls of the further client device, and the server being operable to feed image data to the further client device so as to be displayed on its display. The further client device may comprise a personal computer. The computer may configured to run a program which provides a graphical screen display that emulates the display of the mobile client device, in which the image data is displayed in use.

The settings of the computer generated mobile client may thus be controllable by means of the controls of both of the client devices whereby the devices remain synchronized with changes in the settings.

The computer generated mobile client may include a browser which may be WAP enabled and a gateway may be provided to couple the server to provide access to sites to be accessed by means of the browser.

The invention also includes a server for use in the aforesaid network together with a computer program to be run on the server to provide the data service.

The invention further includes a mobile client device for use in the aforesaid network together with a computer program to be run on its processor to provide the service.

In another aspect the invention provides a method of providing a mobile telecommunications data service, comprising operating the controls of a mobile client device to communicate with a server that runs a server process which provides a computer generated mobile client corresponding to the mobile client device, the computer generated mobile client being operable in response to the operation of the controls of the mobile client device to provide image data corresponding to a display to be displayed by the client device and to feed the image data to the client device to be displayed on the display thereof, feeding the image data to the mobile client device, and displaying the image data on a display on the client device so as to provide a display of the image data.

The server process may have associated re-configurable software, which is also run by the mobile client device, and a re-configuration of the software can be transferred between the server and mobile client device.

The server process may have settings which can be downloaded to the mobile client device to keep them in synchronism.

The method may further include making a change to the computer generated client from another client device, and transferring the change to the mobile client device.

BRIEF DESCRIPTION OF THE DRAWINGS

In order that the invention may be more fully understood an embodiment thereof will now be described by way of example with reference to the accompanying drawings in which.

DETAILED DESCRIPTION OF THE INVENTION

Figure 1:
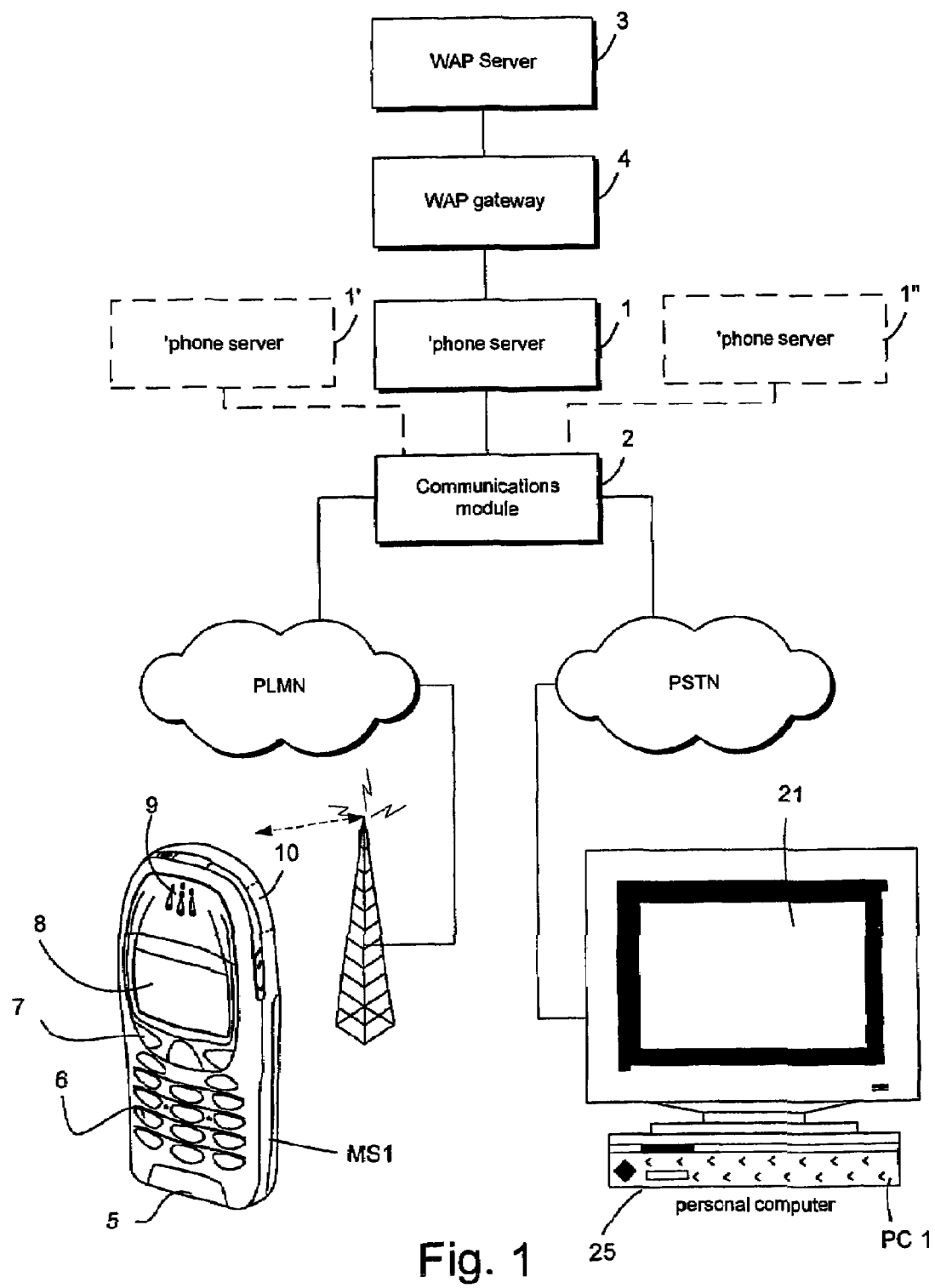
FIG. 1 is a schematic overview of a network in accordance with the invention.

FIG. 1 illustrates an overview of a network in accordance with the invention. A mobile station in the form of a mobile telephone handset MS 1 communicates through a conventional PLMN to make voice calls in a conventional manner. For example, the PLMN and handset may operate according to the GSM recommendations although other systems could be utilized such as DAMPS or UMTS. In addition to the usual voice channels, the mobile station MS1 is operable in a mobile data service and acts as a mobile client device in data communication with a remote phone server 1 through a communications module 2. In accordance with the invention, the phone server 1 is configured to run a server process that provides a computer generated mobile client corresponding to the mobile client device that is corresponding to the mobile station MS1. As will be explained in more detail hereinafter, the server process running at the phone server 1 can be controlled by operation of the keys 6, 7 of the mobile station MS1. The computer generated client running on the phone server 1 can also be accessed from a personal computer PC1 which acts as another client device. The computer PC1 may be connected to the phone server 1 through a network such as a public switched telephone network (PSTN) via the communications module 2.

The server process running at the phone server 1 is WAP enabled and may access WAP sites illustrated schematically as WAP server 3 through a WAP gateway 4, using a WAP browser.

Additional phone servers 1', 1" may be provided for additional mobile stations, connected to the communications module 2, as shown in hatched outline.

The configuration of the handset MS 1 will now be described in more detail. The mobile handset MS 1 includes a microphone 5, keypad 6, softkeys 7, a liquid crystal display 8, earpiece 9 and internal antenna 10. The circuitry of the handset MS 1 is shown in more detail in FIG. 2. Signal processing is carried out under the control of a digital micro-controller 11 which has an associated RAM/ROM 12 and flash memory 13. Electrical analog audio signals are produced by microphone 5 and amplified by pre-amplifier 14. Similarly analog audio signals are fed to earpiece 9 through amplifier 15. The micro-controller 11 receives instruction signals from the keypad and softkeys 6, 7 and controls operation of the LCD display 8.

The information concerning the identity of the user is held on the smart card 16 in the form of a GSM SIM card which contains the usual GSM international mobile subscriber identity and encryption key K, that is used for encoding the radio transmission in a manner well known per se. The SIM card 16 is removably received in a SIM card holder 17. Radio signals are transmitted and received by means of the antenna 10 connected through an rf stage 18 to a codec 19 configured to process signals under the control of the micro-controller 11. Thus, in use, for speech, the codec 19 receives analog signals from microphone amplifier 14, digitizes them into a form suitable for transmission and feeds them to the rf stage 18 for transmission through antenna element 10 to the PLMN shown in FIG. 1. Similarly, signals received from the PLMN are fed through the antenna element 10 to be demodulated by the rf stage 18 and fed to codec 19 so as to produce analog signals fed to amplifier 15 and earpiece 9. The entire device is driven by a rechargeable battery 20.

The handset MS 1 is capable of receiving data in a predetermined channel for example for GSM at 9.6 Kb/s. Additionally, the handset maybe configured to receive high speed circuit switch data (HSCSD) according to the GSM recommendations, at a data rate from 14.4-43.2 Kb/s. However, it will be understood that the invention is not restricted to any particular data rate and that higher rates could be used.

Figure 3:
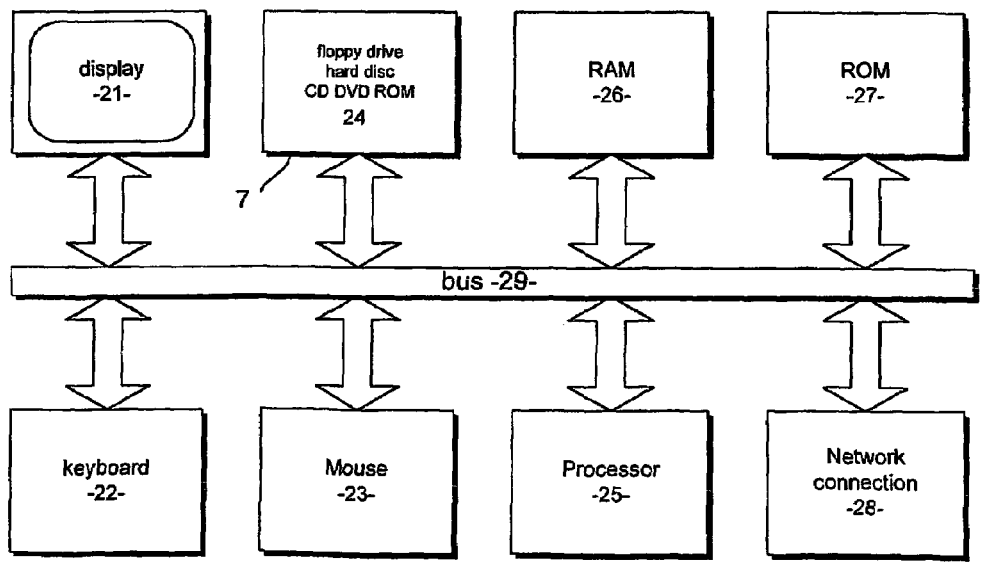
FIG. 3 is a schematic block diagram of the major components of the personal computer shown in FIG. 1.

The general configuration of the personal computer PC 1 is shown in more detail in FIG. 3. The PC is of a conventional configuration that includes a display 21 such as a CRT or plasma display, keyboard 22, mouse 23, storage medium 24 such as a floppy disc drive or hard disc or CD DVD ROM, processor 25, RAM 26, ROM 27 and a network connection 28, all interconnected by means of a bus 29. The network connection 28 may be a modem or other suitable connection to allow the PC to be connected to external networks such as the Internet. In this example, it is assumed that PC 1 is connected to the PSTN shown in FIG. 1 through the network connection 28.

The configuration of the server 1 may be similar to that of PC1 although the display may be omitted.

Figure 4:
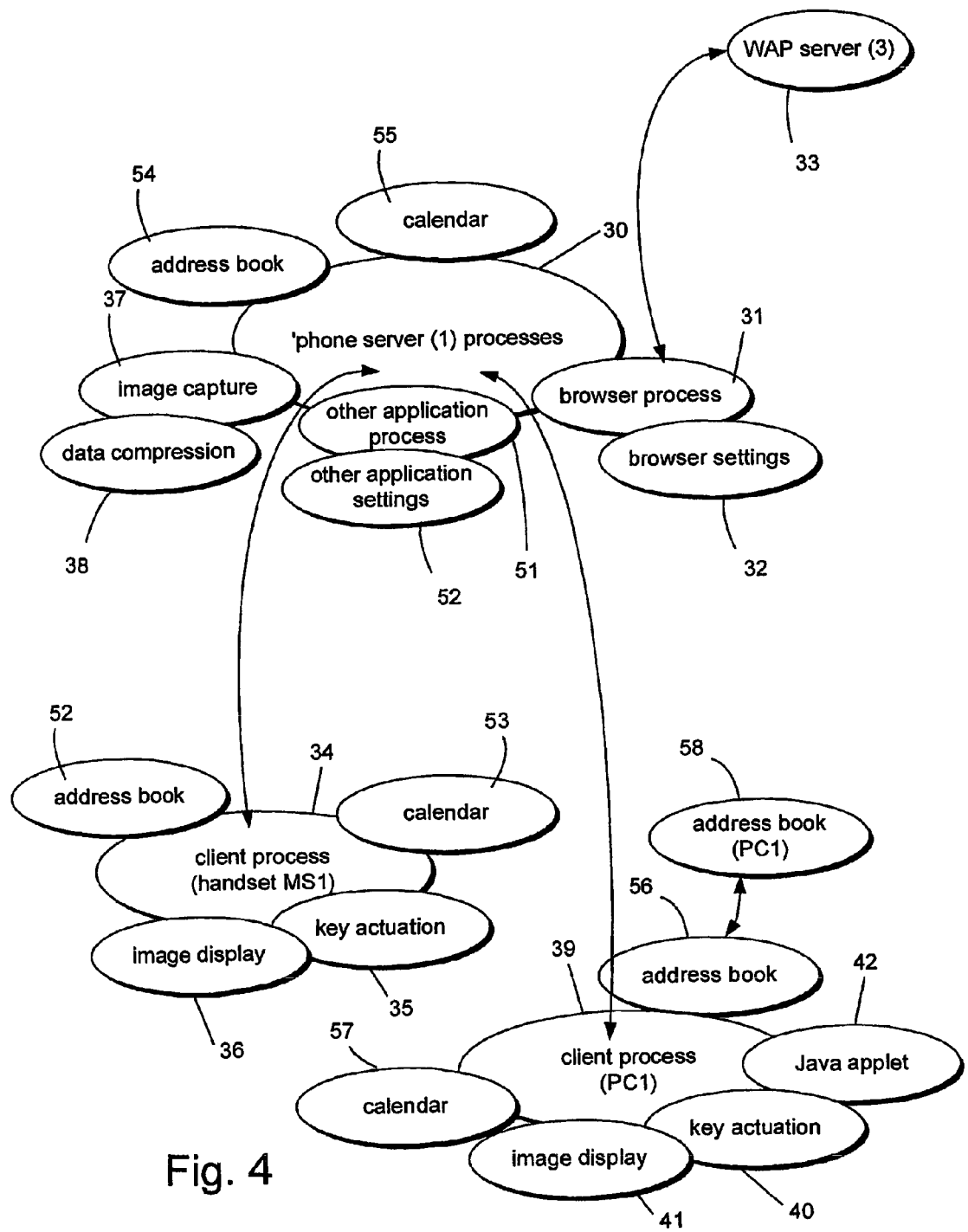
FIG. 4 is a schematic diagram of the software processes carried out in the network

FIG. 4 illustrates the major processes performed at the phone server 1, handset MS 1 and personal computer PC 1.

The processes performed by the phone server 1 are shown generally by reference 30 and include a user interface, which as explained in more detail hereinafter allows the phone server to provide a number of client applications at the server, which can be displayed and controlled remotely from the mobile client device MS 1 or from the client device provided by the personal computer PC1. This will be explained by way of example with reference to a WAP browser process. In more detail, the phone server 1 runs a software application module which gives rise to a browser process 31. Settings for the browser 31 are controlled by a browser setting process 32, which sets bookmarks and other conventional settings for the browser, In this example, the browser is configured to interact with data from WAP sites such as WAP server 3, which runs a WAP server process 33. Examples of suitable WAP browser software are known in the art such as the browser used in the Nokia 7110 mobile telephone handset.

WAP content and its applications are specified in a well known set of content formats based on familiar www content formats. WAP is disclosed in The Wireless Application Protocol Architecture Specification, Version 38, 1998, published by The Wireless Application Protocol Architecture Working Group. Reference is also directed to "Official Wireless Application Protocol: the Complete Standard, Wireless Application Protocol Forum, Limited ISBNO-471-32755-7, 1999."

As known in the art, the WAP environment uses a WAP browser configured to operate with wireless mark-up language, which comprises a lightweight, mark-up language similar to HTML but optimized for hand-held mobile terminals, WML script, a lightweight scripting language similar to Java Script™, Wireless Telephony Application (WTA, WTAI) Telephony Services and Programming Interfaces and content format—a well known set of data formats including images, phone book records and calendar information.

Data can be downloaded to the browser 31 at the phone server 1 from a WAP server such as server 3. The WAP server provides a WML deck of cards corresponding to conventional pages of HTML such that a deck can be downloaded to the browser and the individual cards manipulated by means of the browser. The WAP server 3 is accessed through the WAP gateway 4 shown in FIG. 1.

Operation of the browser process 31 is controlled from one of the client devices and the mobile handset MS 1 will firstly be considered. The handset MS 1 runs a client device process 34 which includes a key actuation process 35 and an image display process 36. The key actuation process 35 monitors actuation of the keys 6, 7 of the handset MS 1 and produces corresponding data which is transmitted in the conventional GSM data channel at 9.6 Kb/s or the previously described HSCSD channel through the PLMN to the user interface in the phone server process 30, and the browser process 31 is controlled in accordance with the key actuation data. Thus, the user of the handset can control operation of the browser process 31 by manipulation of the handset keys 6, 7 through the user interface provided by the phone server process 30.

The browser process 31 thus produces image data corresponding to a screen display generated by the browser in response to operation of the keys on the mobile handset MS 1. The resulting image data is captured by an image capture process 37. The image data conveniently comprises a bitmap of the WAP deck which forms the subject of the browser screen display for the browser process 31. The resulting bitmap image is transmitted through the PLMN from the server 1 to the handset MS 1 for display on the display 8 of the handset. In order to minimize the data to be transmitted, the phone server 1 runs a data compression process 38 to be described in more detail hereinafter. Thus, the image display process 36 of handset MS 1 receives the compressed data, converts it into a corresponding bitmap and feeds the bitmap to the display 8 of mobile handset MS 1. The user of the mobile station can thus display and navigate between cards of the deck that forms the downloaded bitmap image. Each time the browser process 31 produces a new updated display, the resulting image is captured by capture process 37 and supplied for display to the handset MS 1. In this way, the user of handset MS 1 can browse WAP sites in a manner corresponding to a conventional WAP enabled handset although according to the invention; the browsing between WAP decks is carried out with a browser located at the remote server 1 rather than in the handset itself. The image display process 36 at the mobile station may itself comprise a browser, but used as a passive display process in this application.

Figure 5:
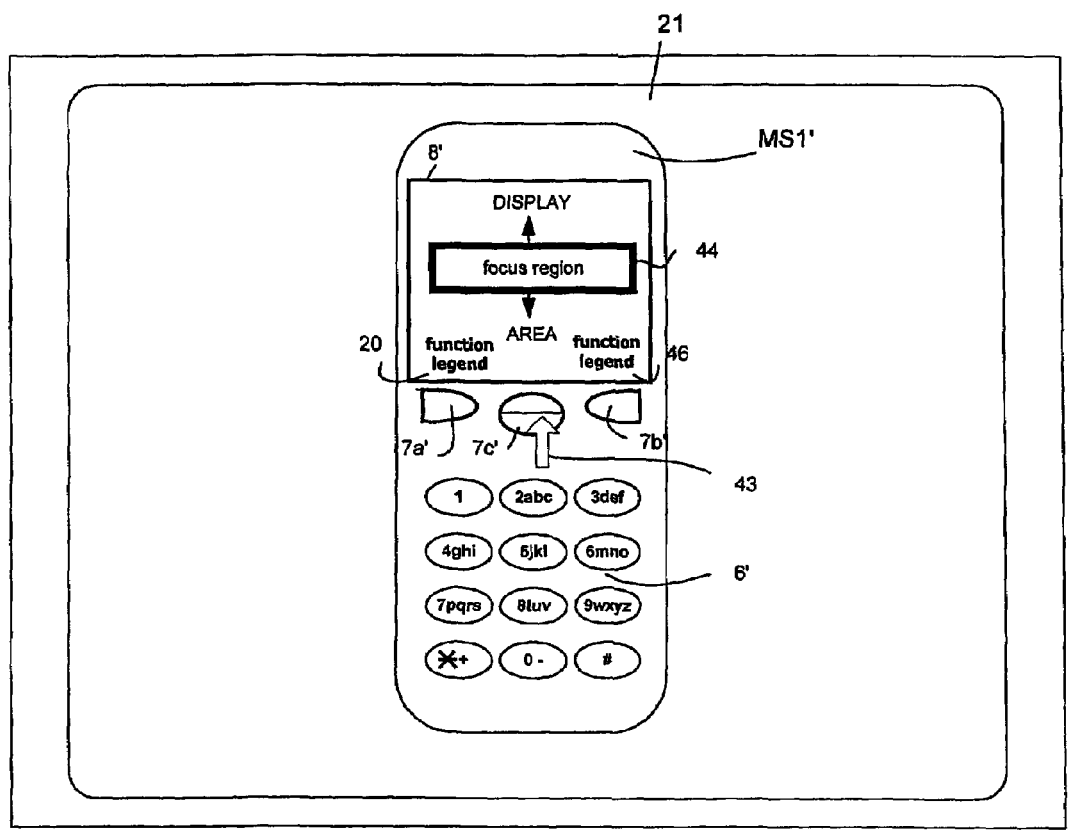
FIG. 5 is a schematic illustration of a display provided on the screen of the personal computer which emulates the mobile telephone handset.

The browser process 31 at the phone server 1 can also be accessed by a client process 39 run on PC 1. A key actuation process 40 monitors key strokes of the keyboard 22 and operation of the mouse 23 of the PC, which is fed through network connection 28 and the PSTN to the communication module 2 and hence to the phone server 1. Thus, the browser process 31 at the phone server 1 can be controlled by keyboard and mouse operations of the personal computer. As previously explained, the image capture process 37 and the data compression process 38 provide a data compressed bitmapped image of the display provided by the browser process 31, which is downloaded to PC 1 and displayed on the display screen 21. The image display is performed by an image display process 41 which may make use of a Java applet 42 that provides a screen display that emulates the screen display and keys of the mobile handset MS 1, as shown in FIG. 5. The Java applet 42 produces a display MS 1', which is an emulation of the handset MS 1 with corresponding keys 6', 7' and a display area 8'. The Java applet 42 may be provided as a download from the phone server 1 so that the user can provide the display MS 1' at any convenient personal computer. The applet 42 may be run by any suitable Java aware virtual machine and thus the image display process 41 may itself comprise a browser such as Microsoft™ Explorer or the Netscape™ Navigator.

Actuation of keys of the resulting virtual handset display MS 1', emulated by the Java applet 42, can be achieved by moving a mouse cursor 43 over an appropriate button 6', 7' and clicking with the mouse. Alternatively, corresponding keys of the keyboard may be utilized to generate the keystroke data.

From the foregoing it will be understood that the display provided on screen 8, 8' corresponds to that of a conventional WAP browser at the handset but the display is actually created by a browser at the phone server 1. Considering for example the display 8', a so-called focus region 44 can be scrolled upwardly and downwardly to select individual parts of the display 8' under the control of the scrolling key 7c'. A selection of the resulting highlighted area within the focus region 44 can be selected by downward operation of key 7c', which is simulated by placing the mouse cursor 43 over the key and clicking on the mouse. Upward and downward scrolling is simulated by placing the mouse cursor on the upper and lower halves of the key 7c' and clicking on the mouse. Softkeys 7a' and 7b' are attributed the function specified by a legend 45, 46 in the display 8', depending on the nature of the data being displayed. It will of course be understood that the handset MS 1 provides corresponding functionality by the use of actual keys 6, 7.

Figure 6:
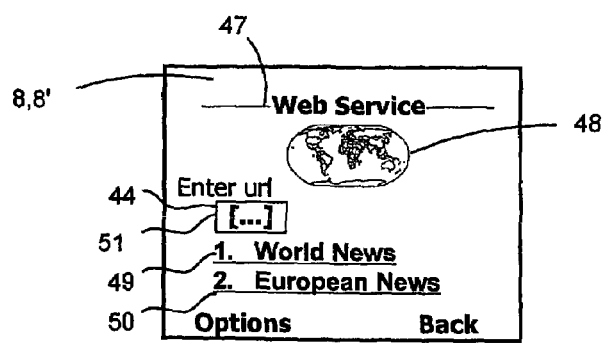
FIG. 6 is a schematic illustration of a screen display provided on the mobile station for a WAP service, the display also being provided on the screen emulation shown in FIG. 5.

An example of an image displayed on display 8, 8' is shown in FIG. 6. The display includes information 47 concerning the web serve; the graphic 48 and links 49, 50 selectable by means of the focus region 44. Additionally, a region 51 allows the user to type in details of a URL (universal resource locator) for a particular WAP server or site. The URL is typed using the key 6 of handset MS 1 or the key 6' shown in FIG. 6 or the keyboard of PC1.

As can be seen from FIG. 6, the display 8, 8' consists of "black" information spaced by relatively large amounts of "white" space rendering the image data suitable for data compression. Conveniently, a run-length encoding technique is used in which the redundant "white" pixels are replaced with tokens. For example, in the following string, the character A represents white pixels and character B represents black pixels.

ABBBBBBAAAAAAA

Using run-length coding, the long string of white pixels can be compressed by using a metachracter as follows:

AB!6A!7

Thus, the monochrome image shown in FIG. 6 can be easily run-length encoded by determining a starting color, in this instance white, storing the length of the run of that color. The next value is the length of the run of the other color that is black and alternates for the rest of the image. The data compression process 38 shown in FIG. 4 uses this run-length encoding technique in order to data compress the bitmapped image data produced by the image capture process 37. Similarly, the image display process 36 and 41 decompresses the compressed image data in an inverse manner.

A process for accessing a URL at the WAP server 3 will now be described with reference to FIG. 7. At step S7.1, the user of the client device i.e. handset MS 1 or PC1, forms keystrokes to request a particular URL. The corresponding keystroke data produced by key actuation process 35 or 40 is fed through either the PLMM or PS'IN to the phone server 1. As will be explained in more detail later, the phone server then uses the browser process 31 to send a request, at step S7.2 to the WAP gateway 4 for connection to the WAP server 3. At step S7.3, the WAP gateway 4 forwards the request to the WAP server 3.

At step S7.4, data from the accessed web site is sent to the WAP gateway 4 which, in turn, at step S7.5, sends the data to the phone server 1. The data is then processed as will be described in more detail hereinafter and a corresponding data compressed, browser bitmapped image is downloaded to the client device at step S7.6.

Figure 8:
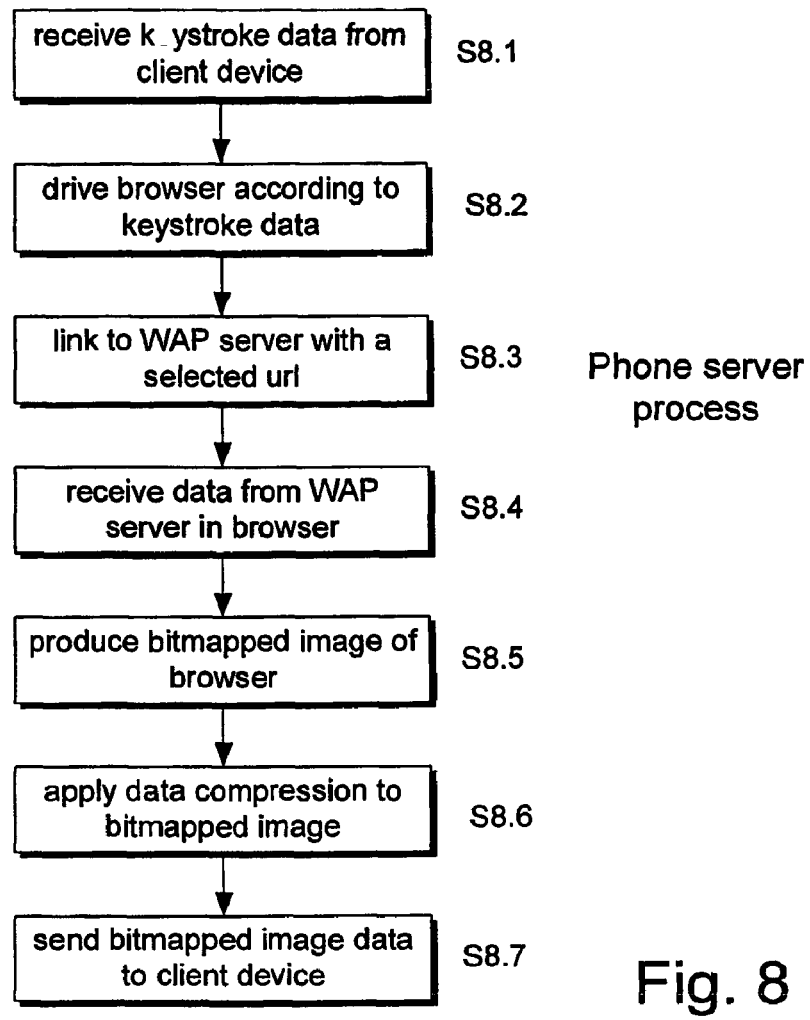
FIG. 8 illustrates activities at the phone server.

The process carried out at the phone server 1 is shown in more detail in FIG. 8. At step S8.1, the keystroke data sent at step S7.1 is received by the phone server 1. At step S8.2, the keystroke data is used to drive the browser i.e. the browser process 31 shown in FIG. 4. Thus, the browser is provided details of the URL for the WAP server 3 contained within the keystroke data.

As a result, at step S 8.3, the browser process 31 establishes a link to the WAP server 3 with the selected URL. The link being directed through the WAP gateway 4 as described at step S7.3 in relation to FIG. 7.

Figure 7:
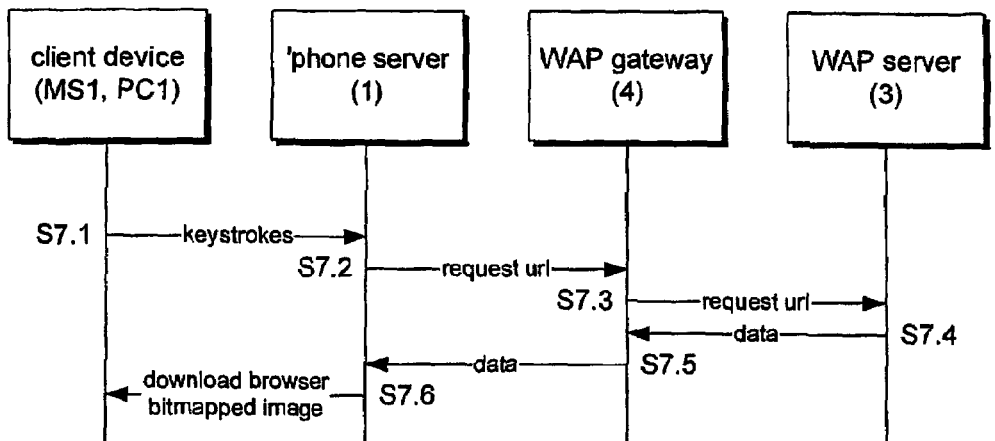
FIG. 7 is a schematic illustration of signal interchanges that occur during operation of the browser.

As explained in relation to FIG. 7, data from the WAP server 3 is received by the phone server at step S7.4 and 7.5. As shown in FIG. 8, this data is directed at step 88.4 to the WAP browser process 31. As a result, the WAP browser produces display data corresponding to the data from the WAP server 3.

Then, at step S8.5, the image capture process 37 produces a bitmapped image corresponding to a screen display generated by the browser in response to the downloaded data from WAP server 3. The bitmapped image data is then data compressed by the data compression process 38 at step S8.6. At step 88.7, the data compressed bitmapped image data is sent to the requesting client device i.e. step S7.6 in FIG. 7.

As previously explained, the data is then decompressed at the client device by image display process 36 or 41 and displayed on the display 8, 8'. As previously explained, the display process 41 may comprise a conventional browser used on the PC for surfing the web. Similarly, the display process 36 may comprise a conventional browser for mobile telephony which may be used additionally for conventional WAP browsing with its own settings, if desired.

The downloading of the bitmapped image can be carried out in response to each update of the image display data or repetitively so that the image display is refreshed e.g. at a rate of eight frames per second, although other refresh rates can be used depending on the data capacity of the link between the client and server devices and the particular application.

Figure 9:
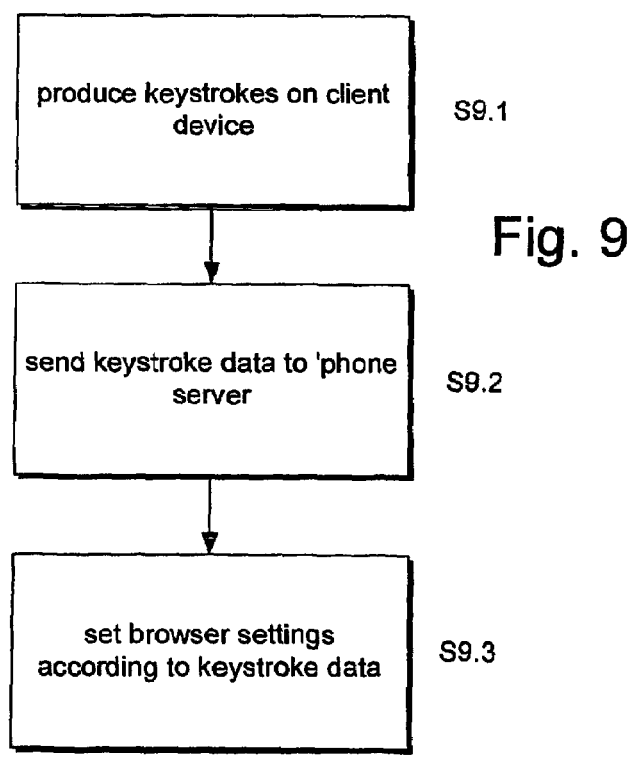
FIG. 9 illustrates the manner in which the settings of the browser can be adjusted from either one of the client devices.

The provision of the browser process 31 at the server 1 has the advantage that when the browser is accessed either from the handset MS 1 itself or from the computer PC 1, the current browser settings are held by the server and thus the client devices both remain in synchronism. It will be understood that the browser 31 has user settable bookmarks and other references particular to the user. A process for controlling these browser settings 32 is shown in FIG. 9. At step S9.1 the user produces keystrokes on either one of the client devices MS 1, PC 1 to control the browser settings and corresponding keystroke data is sent to the phone server 1 at step S9.2. This data is used to set the browser setting in accordance with the keystroke data at step 89.3. Thus, the browser is responsive to changes to the settings produced by either one of the client devices.

The server process 30 can provide a computer generated mobile client which is an exact copy of the client functionality provided at the mobile station MS1. It will be understood that the handset MS 1 may itself be capable of interacting with IP sites and may include its own calendar, address book and other settings, as well known in the art. Referring to FIG. 4, this is shown schematically by the client process 34, together with an address book process 52 and calendar 53 associated with the mobile client device MS 1. Thus, the phone server process 30 and. corresponding address book process 54 and calendar 55 can be configured to provide an exact replica of the functionality at the mobile device itself, and the corresponding processes at the mobile station MS1 and the phone sever can be kept in synchronism.

Similarly, the phone server process 30 can be kept in synchronism with corresponding functionality on PC1. As shown in FIG. 4, the client process 31 running on PC1 has an associated address book 56 and calendar 57. Furthermore, the PC1 may run its own address book 58, for example associated with a proprietary e-mail system.

Figure 10:
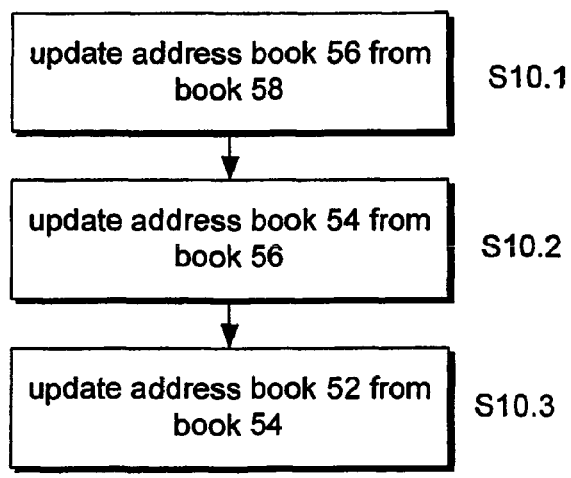
FIG. 10 illustrates a process for updating address books.

The provision of the phone server process 30 allows updates to be carried out easily. Considering for example the address books, the user of mobile handset MSI may have an address book 58 on PC1, which can be used to update the address book on the server I and in the handset MS1, as shown in FIG. 10.

At step S10.1, the data in address book 58 on PC1 is utilized to update the data in address book 56 running on the client process 39. Then at step Si0.2, the address book 56 having itself been updated, is used to update the data in address book 54 running in the phone server process 30. At step S10.3, the updated data in address book 54 is utilized to update the data in address book 52 running on the client process 34 at the mobile handset MS1. It will be understood that the updating process can also be carried out in a reverse manner so that changes to the address book 52 can be used to update the other address books. Thus address book 54 at the phone server 1 is always kept up to date and can be used as a reliable reference source of information.

It will be understood that the calendars 53, 55 and 57 can be kept in synchronism by a similar process and similarly synchronized with external calendars.

The phone server can also be used to download software updates to the mobile handset MS1. For example, changes to details of available networks can be updated by a service provider changing the phone server process 30. Thus, by maintaining the client process 34 at the handset in synchronism with the phone server process 30, the handset is automatically updated with such software changes.

The phone server 1 may run client applications other than the browser to download bitmapped image data to the client devices MS 1, PC 1. For example, a computer game may be run on the phone server 1, which is controllable by keystrokes on the client device and the resulting image display may be downloaded for example at a rate of eight frames per second to the handset MS 1 or the computer PC 1. In FIG. 4, this is shown generally as another application process 51. The application may have settings 52 which can be controlled by the same process as described with reference to FIG. 9. Alternatively, the game or other application may be resident on another server, not shown, and controlled from the client device through the user interface provided by the phone server process 30.

Figure 2:
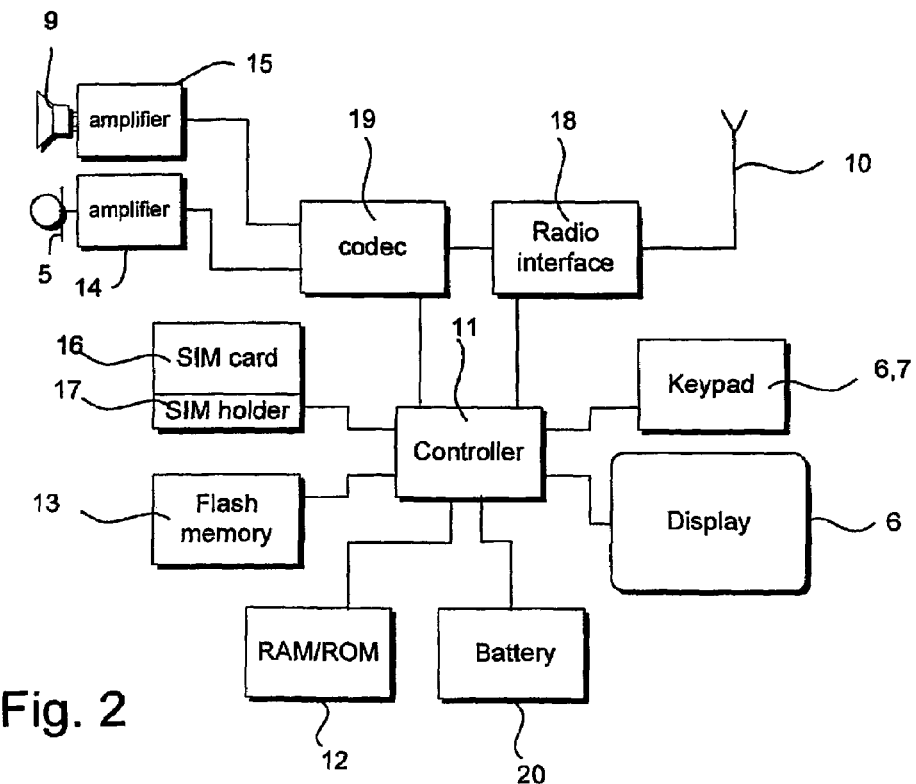
FIG. 2 is a schematic block diagram of the major circuit components of the mobile station shown in FIG. 1.

Furthermore, although the telephone handset MS 1 includes conventional voice channels as described with reference to FIG. 2, it is possible according to the invention to dispense with the conventional voice channels and use voice over IP (VO1P). In this way, the handset MS I is made an extremely "light" device permitting further miniaturization and simplification of the processing circuits of the handset.

The invention claimed is:

1. A network for providing a mobile telecommunications data service, comprising:
   a mobile client device including user actuable controls and a display device to provide a display of data; and
   a server located remotely of the mobile client device to provide data thereto and being configured to run a server process locally on the server that provides a computer generated mobile client corresponding to the mobile client device, the computer generated mobile client being operable in response to the operation of the controls of the mobile client device to produce an image corresponding to an entire display to be displayed by the mobile client device, the server being further configured to run an image capture process to capture the image produced by the computer generated mobile client and to feed the captured image to the mobile client device to be displayed on the display thereof, the captured image comprising a graphic image corresponding to the display generated by the computer generated mobile client, wherein the captured image is not represented by the text of a markup language file.

2. A network according to claim 1 wherein the server process includes a user interface for a client application, the user interface being operable to receive commands produced by operation of the controls of the mobile client device and to produce corresponding commands for the client application.

3. A network according to claim 2, wherein the server is configured to run the client application.

4. A network according to claim 2, wherein the client application comprises a browser.

5. A network according to claim 4 including a gateway coupled to the server to provide access to sites to be accessed by means of the browser.

6. A network according to claim 2, wherein the client application comprises a computer game.

7. A network according to claim 1, wherein the browser is WAP enabled.

8. A network according to claim 1, wherein the server process is configured to compress the captured image prior to being fed to the mobile client device.

9. A network according to claim 1, including a further client device with user actuable controls and a display device to provide a display of data, the computer generated mobile client being responsive to actuation of the controls of the further client device and to feed the captured image to the further client device to be displayed on the display thereof so as to provide a display of the captured image.

10. A network according to claim 9, wherein the further client device comprises a personal computing device.

11. A network according to claim 9, wherein the computer generated mobile client has settings that are controllable by means of the controls of either said mobile client device or said further client device.

12. A network according to claim 10, wherein the personal computing device is configured to run a program which provides a graphical screen display that emulates the display of the mobile client device, in which said captured image is displayed.

13. A network according to claim 1, wherein the mobile client device is configured to provide a speech communication channel by VOIP.

14. A network according to claim 1, wherein the mobile client device comprises a mobile telephone handset.

15. A network according to claim 1, wherein the mobile client device comprises a PDA.

16. A network according to claim 1, wherein the computer generated mobile client has the same functionality as the mobile client device.

17. A server for providing a data service in a mobile telecommunications network to a mobile client device that includes user actuable controls and a display device to provide a display of data, the server being located remotely of the mobile client device to provide data to the mobile client device and being configured to run a server process locally on the server that provides a computer generated mobile client corresponding to the mobile client device, the computer generated mobile client being operable in response to the operation of the controls of the mobile client device to produce an image corresponding to an entire display to be displayed by the mobile client device, the server further being configured to run an image capture process to capture the image produced by the computer generated mobile client and to feed the captured image to the mobile client device to be displayed on the display thereof, the captured image comprising a graphic image corresponding to the display generated by the computer generated mobile client, wherein the captured image is not represented by the text of a markup language file.

18. A computer readable storage medium storing a computer program code to be run on a server computer for providing a data service in a mobile telecommunications network to a mobile client device that includes user actuable controls and a display device to provide a display of data and that is located remotely of the server computer, the program being configured to run a server process locally on the server that provides a computer generated mobile client corresponding to the mobile client device, the computer generated mobile client being operable in response to the operation of the controls of the mobile client device to produce an image corresponding to an entire display to be displayed by the mobile client device, the program further being configured to run an image capture process to capture the image produced by the computer generated mobile client and to feed the captured image to the mobile client device to be displayed on the display thereof, the captured image comprising a graphic image corresponding to the display generated by the computer generated mobile client, wherein the captured image is not represented by the text of a markup language file.

19. A mobile client device for use in a network to receive a mobile telecommunications data service, the device including user actuable controls, a display device to provide a screen display of data, and a processor operable to communicate with a server through a telecommunications network, the server being located remotely of the mobile client device to provide data to the mobile client device and being configured to run a server process locally on the server that provides a computer generated mobile client corresponding to the mobile client device, the computer generated mobile client being operable in response to the operation of the controls of the mobile client device to produce an image corresponding to an entire display to be displayed by the mobile client device, the server further being configured to run an image capture process to capture the image produced by the computer generated mobile client and to feed the captured image to the mobile client device to be displayed on the display thereof, the captured image comprising a graphic image corresponding to the display generated by the computer generated mobile client, wherein the captured image is not represented by the text of a markup language file, and the processor of the mobile client device being operable to send information relating to the actuation of the controls to the server through the telecommunications network, and to receive said captured image from the server and cause said captured image to be displayed on the display device.

20. A computer readable storage medium storing a computer program code to be run on a processor of a mobile client device for use in a network to receive a mobile telecommunications data service, the mobile client device including user actuable controls, a display device to provide a screen display of data, and the processor operable to communicate with a server through a telecommunications network, the server being located remotely of the mobile client device to provide data to the mobile client device and being configured to run a server process locally on the server that provides a computer generated mobile client corresponding to the mobile client device, the computer generated mobile client being operable in response to the operation of the controls of the mobile client device to produce an image corresponding to an entire display to be displayed by the client device, the server further being configured to run an image capture process to capture the image produced by the computer generated mobile client and to feed the captured image to the mobile client device to be displayed on the display thereof, the captured image comprising a graphic image corresponding to the display generated by the computer generated mobile client, wherein the captured image is not represented by the text of a markup language file, the program being configured to send information relating to the actuation of the controls to the server through the telecommunications network, and to direct said captured image from the server to be displayed on the display device.

21. A program according to claim 20 operable to display the captured image in a display which emulates a mobile client device.

22. A method of providing a mobile telecommunications data service, comprising:

operating the controls of a mobile client device to communicate with a server located remotely of the mobile client device to provide data to the mobile client device for display;

the server running a server process that provides a computer generated mobile client corresponding to the mobile client device, the computer generated mobile client being operable in response to the operation of the controls of the mobile client device to produce an image corresponding to an entire display to be displayed by the mobile client device;

the server further running an image capture process that captures the image produced by the computer generated mobile client, to be fed to the mobile client device to be displayed on the display thereof, the captured image comprising a graphic image corresponding to the display generated by the computer generated mobile client, wherein the captured image is not represented by the text of a markup language file;

feeding the captured image to the mobile client device; and displaying the captured image on a display on the mobile client device so as to provide a display of the captured image.

23. A method according to claim 22, wherein the server process has associated re-configurable software, the software also being run by the mobile client device, and including transferring a re-configuration of the software between the server and mobile client device.

24. A method according to claim 22, wherein the server process has settings and including downloading changes in the settings to the mobile client device.

25. A method according to claim 22, including making a change to the computer generated client from another client device, and transferring the change to the mobile client device.

* * * * *